July 26, 1966  B. A. PITEO  3,263,046
MULTIPOLE CIRCUIT BREAKER
Filed April 12, 1963  3 Sheets-Sheet 1
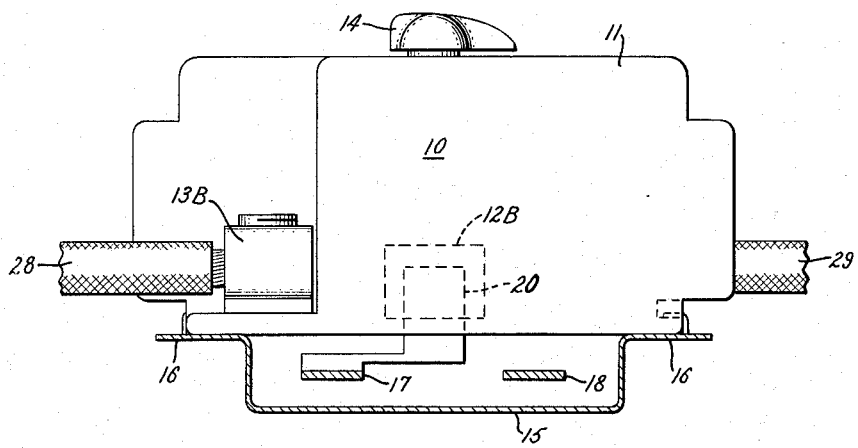
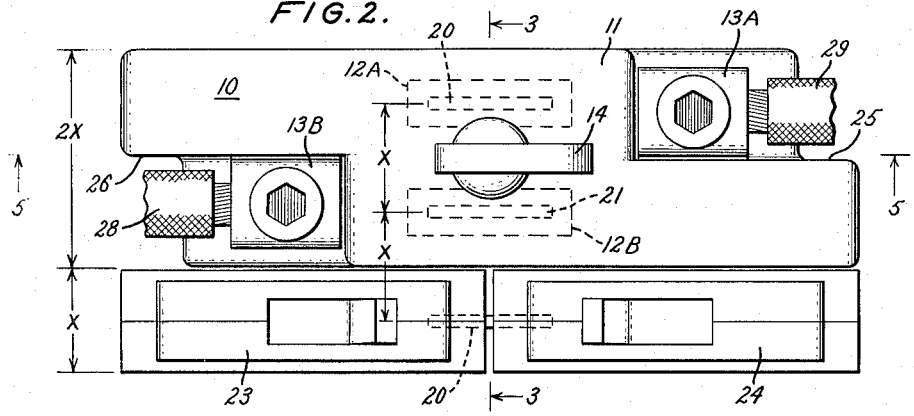
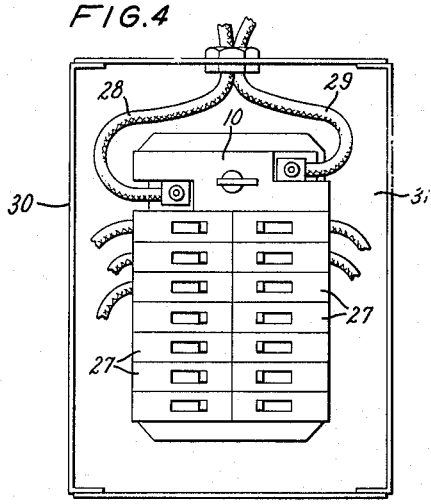
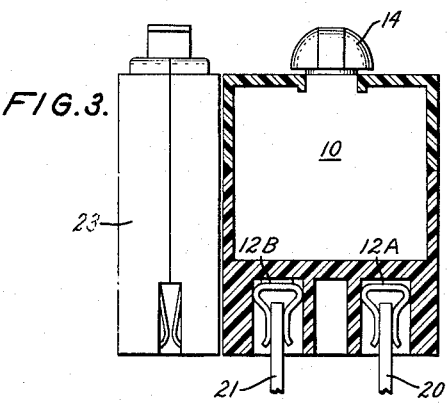
INVENTOR:
BENJAMIN A. PITEO
BY Robert F. Casey
ATTORNEY.

July 26, 1966  B. A. PITEO  3,263,046
MULTIPOLE CIRCUIT BREAKER
Filed April 12, 1963  3 Sheets-Sheet 2
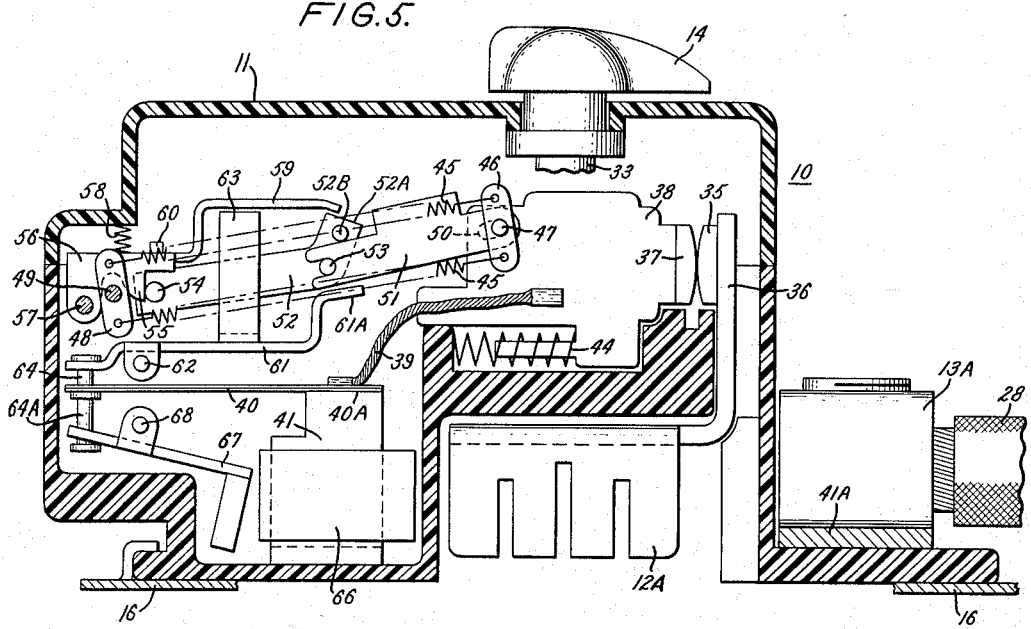
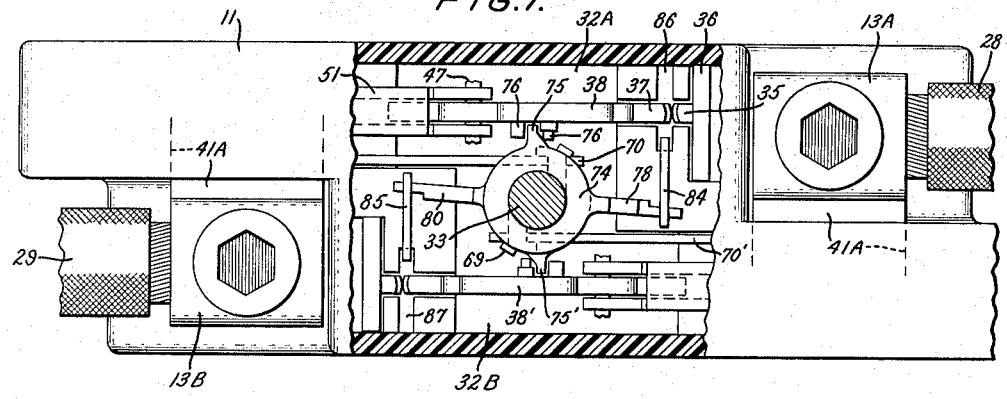
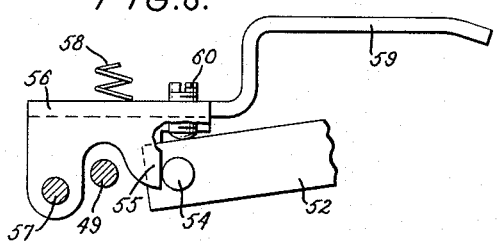
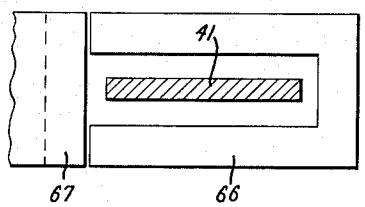
INVENTOR:
BENJAMIN A. PITEO
BY Robert A. Carey
ATTORNEY.

July 26, 1966  B. A. PITEO  3,263,046
MULTIPOLE CIRCUIT BREAKER
Filed April 12, 1963  3 Sheets-Sheet 3

INVENTOR:
BENJAMIN A. PITEO
BY Robert T. Casey
ATTORNEY.

United States Patent Office 3,263,046
Patented July 26, 1966

3,263,046
MULTIPOLE CIRCUIT BREAKER
Benjamin A. Piteo, Forestville, Conn., assignor to General Electric Company, a corporation of New York
Filed Apr. 12, 1963, Ser. No. 272,721
10 Claims. (Cl. 200—116)

My invention relates to electric circuit breakers, and particularly to electric circuit breakers of the plug-in type adapted for use with other circuit breakers in a panel assembly.

A commonly used type of circuit breaker panel assembly includes one or more rows of plug-in type contacts, disposed and arranged to receive one or more rows of electric circuit breakers. Because of space limitations ordinarily encountered in locations where such devices are used, it is desirable that the size of such panel assemblies be kept to a minimum. At the same time, the increasing utilization of electric power has necessitated an increase in the number of circuit breakers included in such panel assemblies and in the capacity thereof, and particularly, in the capacity of "main" circuit breakers, i.e., the circuit breakers which control the total power coming into the panel assembly. Thus commonly used "main" circuit breakers, in recent years, have increased in capacity from 60-amperes to 100-amperes, while many applications today require 200-ampere main circuit breakers.

In the past, circuit breakers of the panel type, and especially of the plug-in type, have not been provided in such high capacities. Other types of circuit breakers, such as "industrial" circuit breakers have accordingly been used, requiring a comparatively large amount of space, including a substantial amount of wiring space in order to connect incoming power conductors to the terminals of such breakers.

Also, plug-in type circuit breaker panel assemblies are commonly made on a modular basis, that is, a series of plug-in type stationary contacts are provided which are equally spaced, and single, two, and three-pole circuit breakers are provided whose widths are whole number multiples of the spacing between such contacts. That is, the width of a single-pole breaker is 1X, where X equals the module or distance between stationary contacts. The width of a two-pole breaker is 2X, and that of a three-pole breaker is 3X. In the case of a 200-ampere circuit breaker, however, the diameter of the power conductor which must be connected to the circuit breaker to carry 200 amperes is greater than the total space between two such adjacent plug-in contacts of conventional panels.

It is an object of the present invention to provide an electric circuit breaker of relatively high capacity which is adapted for use in panel assemblies and which occupies a relatively small space therein.

It is another object of the invention to provide a two-pole circuit breaker having means for connecting relatively large incoming cables thereto in a panel assembly without requiring a large amount of wiring space.

It is another object of the invention to provide an electric circuit breaker adapted for use with spaced plug-in contacts of a predetermined module and having electric conductor power connector terminals thereon of greater width than the spacing between such module.

It is another object of the invention to provide a two-pole electric circuit breaker having the poles thereof arranged in side-by-side relation, together with means for operating such circuit breakers simultaneously, and for causing automatic opening of both circuit breakers if one of such circuit breakers should open automatically, which shall be of high capacity and of minimum width.

In accordance with the invention in one form, I provide a two-pole electric circuit breaker comprising an elongated generally rectangular casing have plug-in type power connecting terminals at the central portion of the underside thereof, and having cable connecting terminals at each of the opposite ends thereof. The plug-in type terminals are spaced apart a distance equal to a predetermined panel module. The cable connecting terminals are located at opposite ends of the body, rather than both at the same end, whereby each connector may have a width greater than the aforesaid module, that is, more than one-half the width of the whole breaker.

In accordance with another aspect of the invention, I provide a two-pole circuit breaker assembly of minimum width including a pair of side-by-side circuit breaker mechanisms each including a transversely slidable operating member, and a rotatable operating member positioned between the breaker mechanisms. The poles are in end-to-end reversed relation, whereby the slidable operating members work in opposite directions and can be operated by projections extending from opposite sides of the intermediate rotatable operating member.

The invention will be more fully understood from the following detailed description, and its scope will be pointed out in the appended claims.

In the drawings,

FIGURE 1 is an end elevation view of a portion of an electric circuit breaker panel assembly including an electric circuit breaker constructed in accordance with the invention;

FIGURE 2 is a top plan view of the electric circuit breaker panel assembly shown in FIGURE 1;

FIGURE 3 is a sectional view taken on the line 3—3 of FIGURE 2;

FIGURE 4 is a top plan view of an electric circuit breaker panel assembly similar to that shown in FIGURES 1–3, shown mounted in an enclosure with power conductors connected thereto;

FIGURE 5 is an elevational view in section, taken substantially on the line 5—5 of FIGURE 2;

FIGURE 5A is a fragmentary plan view of a portion of the current-responsive mechanism of the circuit breaker of FIGURE 5;

FIGURE 6 is a fragmentary view showing a latch portion of the mechanism of FIGURE 5;

FIGURE 7 is a top plan view of the circuit breaker of FIGURES 2 and 5, a portion of the casing being broken away;

Figure 8:
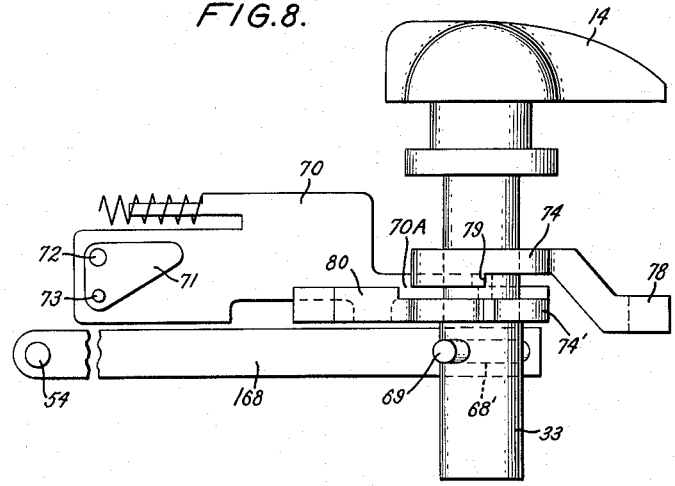
FIGURE 8 is a fragmentary elevational view showing manual operating and resetting portions of the operating mechanism of the circuit breaker of the invention.
Figure 9:
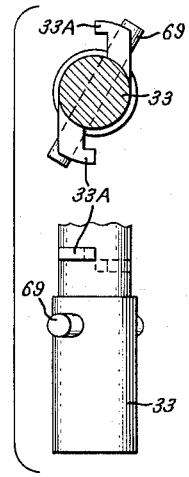
Figure 10:
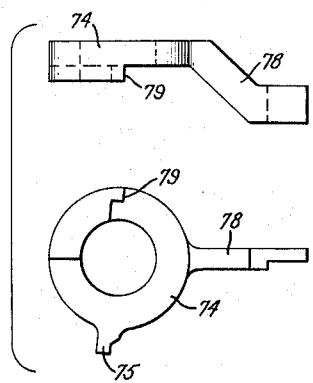
Figure 11:
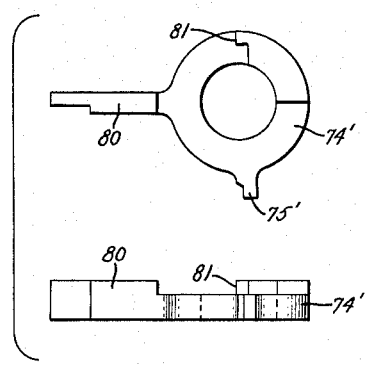
Figure 12:
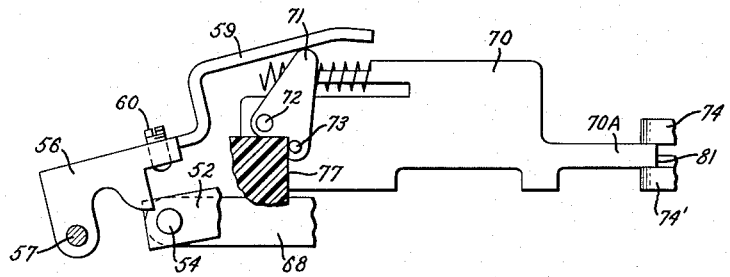

FIGURE 9 includes top plan and elevational views of the handle supporting shaft of the operating mechanism shown in FIGURE 8;

FIGURE 10 includes top plan and elevational view of another portion of the mechanism of FIGURE 8;

FIGURE 11 includes top plan and elevational views of another portion of the mechanism of FIGURE 8, and FIGURE 12 is a fragmentary elevational view showing a portion of the mechanism of the circuit breaker as shown in FIGURE 5, in an actuated or releasing position.

Referring first to FIGURES 1–4, the invention is shown as incorporated in a two-pole electric circuit breaker designated generally as 10 and comprising an elongated generally rectangular insulating casing 11 having a pair of plug-in type connectors 12A, 12B, accessible from the back wall thereof. The breaker 10 also includes a pair of cable-connecting terminals 13A, 13B, of the screw-clamp type, positioned one at each end of the casing. A manually engageable operating handle 14, which is of the rotary or "twist" type is also provided, carried by the top of the circuit breaker casing 11 generally centrally thereof.

The circuit breaker 10 includes a pair of circuit breaker mechanisms, to be described, each connected between one of the clamp type connectors 13A, 13B and a corresponding plug-in type connector 12A, 12B. The circuit breaker 10 is shown in FIGURE 1 as mounted on a panel interior assembly comprising a supporting pan 15 having a pair of outwardly directed flanges 16. The pan 15 carries a pair of power bus bars 17 and 18, mounted thereon by suitable insulating means, not shown. The bus bars 17 and 18 each include a plurality of upstanding plug-in type contact blades or stabs 20, 21 respectively.

In FIGURE 2, the panel assembly is shown as including the circuit breaker 10 and a pair of conventional single pole circuit breakers 23 and 24, each of which includes a plug-in type connecting socket at one corner thereof, not shown, whereby both breakers are connected to a single stationary contact blade 20. As indicated in FIGURE 2, if the distance between the stationary plug-in type contacts 20 and 21 is called "X," then the width of conventional single pole circuit breakers 23, 24 will also be "X" (diminished a small amount to provide clearance). In accordance with the invention, the circuit breaker 10 has its plug-in type contacts 12A, 12B spaced apart a distance equal to the X module, and the casing 11 is made of a width equal to 2X.

It will be observed that connectors 13A, 13B are accommodated which are greater in width than the X module. This is made possible by the fact that the connectors 13A and 13B are not placed in side-by-side relation, but rather are placed at opposite ends of the circuit breaker. In addition, the circuit breaker casing 11 is cut-away at the corners as indicated at 25 and 26 respectively.

In FIGURE 4, the circuit breaker 10 is shown in mounted relation within a panel assembly with additional conventional circuit breakers 27 and with incoming main power cables 28, 29, connected thereto, all mounted within a metallic box or enclosure 30.

As may be seen from FIGURE 4, the location of the connectors 13A and 13B at opposite ends of the breaker 10, plus the provision of the cut-outs 25 and 26, facilitates the bending and the positioning of the large cables 28 and 29. Such cables are commonly of about one inch in diameter and covered with heavy insulation. They are therefore difficult to bend and form. At the same time, the space or "wiring gutter" (indicated generally at 31 in FIGURE 4) is relatively restricted. By means of the present invention, however, a two-pole circuit breaker of relatively large capacity may be connected in such a panel assembly without great difficulty.

By the arrangement shown, electric power coming in through the cables 28 and 29 is connected by the two-pole circuit breaker 10 to the bus bar stabs 20 and 21 respectively. Such power is then fed from the bus bars 17, 18, to the branch circuit breakers 23, 24, 27. Thus rotation of the operating handle 14 serves to connect or disconnect the electric power flowing from the cables 28, 29 to all the branch circuit connecting devices 23, 24, 27.

The mechanical and electrical operation of the circuit breaker 10 will be understood by reference to FIGURES 5–13.

Referring to FIGURES 5–7, the circuit breaker includes an operating shaft 33 rigidly connected to the handle 14 for operation thereby. The insulating casing 11 includes a pair of elongated relatively narrow passage ways or chambers 32A and 32B (see FIGURE 7).

The circuit breaker mechanisms contained in the chambers 32A, and 32B are essentially identical excepting that they are in end-to-end reversed relation, as will be described, and therefore the construction of only the mechanism contained in chamber 32A will be described. A stationary contact 35 is supported on a terminal strap 36, which in turn carries the plug-in-type connector 12A. A movable contact 37 is also provided, which is rigidly attached to a contact carrier plate 38, which is supported for reciprocal movement to move the contact 37 into and out of engagement with the contact 35. The contact carrier plate 38 is connected by a flexible conductor 39 to one end 40A of a bimetallic strip 40, which is supported on an output terminal strap 41. The output terminal strap 41 includes a portion 41A, see FIGURE 7, extending laterally to the corresponding screw-clamp type terminal 13A.

*Contact operating mechanism*

The mechanism for operating the movable contact carrier plate 38 reciprocally between on and off positions is shown in FIGURES 5 through 13.

A compression spring 44 is provided, acting against a portion of the casing at one end and on the contact carrier 38 at the other end, so as to bias the contact carrier 38 toward closed circuit position at all times.

For the purpose of moving the contact carrier member 38 to open circuit position despite the bias of the compression spring 44, two pairs of tension-type opening springs 45 (only one pair shown in FIGURE 5) are provided, each pair being connected at one end to a member 46 carried by a pin 47. The pin 47 is carried by one end of a first toggle link 51. The first toggle link 51 is connected to a second toggle link 52 by means of a knee pin 53, and the remote end of the second toggle link 52 is releasably held by a latch pin 54 in a manner to be described. The opposite ends of the springs 45 are connected to a member 48 carried by a stationary pin 49 mounted in the insulating casing 11.

The pin 47 also extends through an elongated hole or slot 50 in the contact carrier 38. Upon release of the pin 54 in a manner to be described, therefore, the toggle linkage 51, 52 moves while still in the straightened condition, to the left as viewed, permitting the pin 47 to move to the end of the slot 50 and then to move the carrier 38 to open circuit position.

The latch pin 54 normally rests against and is held by a latch projection 55 of a latch member 56 pivotally supported on a pin 57 carried by the casing. The latch member 56 is constantly biased in clockwise or latching direction by means of a compression spring 58. The latch member 56 is generally U-shaped, and has its bight portion extended as at 59 for a purpose to be described. The latch member 56 carries a calibrating screw 60 in the bight portion thereof, the lower end of which engages an edge portion of the toggle link 52 (see FIGURE 6).

It will be observed that an upward force on the right hand portion 59 of the latch member 56 such as to rotate the latch member counterclockwise, will move the latch portion 55 out of engagement with the pin 54, thus permitting the entire toggle linkage comprising the links 51 and 52, to move to the left. This causes the pin 47 to move to the end of the slot 50 in the contact carrier 38 and thereafter to move the contact carrier 38 to open position, overcoming the bias of the compression spring 44, as previously described.

For the purpose of moving the latch member 56 to released position upon the occurrence of predetermined current conditions in the circuit, a trip member 61 is provided which is pivotally supported on a pin 62 in the casing and which has a projection 63 terminating closely adjacent the extension 59 of the latch member 56. The trip member 61 is coupled to the bimetallic strip 40 by means of the connecting member 64.

Excessive current for a sustained period of time through the circuit breaker causes heat to be generated in the foot portion 40A of the bimetallic strip 40 to which the flexible conductor 39 is connected, and also to some extent in the reduced portion of the terminal strap 41 adjacent the bimetallic strip. This heat flows by conduction along the length of the bimetallic strip 40, causing it to warp in a direction to move its free end downwardly as viewed in FIGURE 5. Such downward movement rotates the trip member 61 counterclockwise about its pivot 62, bringing the projection 63 into engagement with the extension 59 of the latch member 56 to cause tripping.

For the purpose of causing magnetic tripping, a magnetic field piece 66 is provided which is generally U-shaped, having its bight portion at the right end as shown in FIGURE 5A. The field piece 66 is so disposed that the conductor 41 passes between the legs thereof. An armature member 67 is also provided, pivotally supported on a pivot pin 68 in the casing, and connected by the connector 64A to the trip member 61. Upon the occurrence of sudden high currents in the circuit, the field piece 66 becomes energized, attracting the armature 67 thereto, rotating the armature member 67 about its pivot 68, moving the connector 64A downwardly, and thereby moving the latch member 61 counterclockwise about its pivot 62 to cause tripping in a manner previously described.

The latch member 61 is also provided with an extension 61A so arranged and disposed as to engage the toggle linkage 51, 52 near its knee point so as to forcibly break the toggle at the same time that the latch member 56 is being released.

The toggle link 52 includes an offset portion 52A adjacent the knee of the toggle linkage, carrying a stop pin 52B. The stop pin 52B is so disposed and arranged as to overlie an edge portion of the toggle link 51 when the toggle links are in straightened condition, thereby limiting overtravel or collapse of the toggle links.

In order to reset the mechanism following tripping, an elongated resetting link 168 is provided, see FIGURE 8, which has an elongated hole 68' therein through which an operating pin 69, carried by the handle shaft 33, projects. When the handle shaft 33 is rotated, the link 168 is moved longitudinally by the action of the pin 69. The reset link 168 is connected at its other end to the pin 54 so that longitudinal shifting of the link 168 causes the pin 54 to be moved longitudinally in the resetting direction until the latch member 56 can once again drop behind it to restrain it in the on position, the movable contact member 37 being moved, simultaneously, to closed position.

It will be observed that if the manual member is forcibly retained in the on position, or in the reset position, the pin 54 will be held in latched position regardless of movement of the latch member 56. For this reason, the latch member 61 is provided with an extension 61A. If tripping does not occur therefore when the bimetallic strip deflects far enough to rotate the latch member 56 slightly, further heating and deflection occurs, and the end 61A of the latch member 61 engages the knee pin 53 of the toggle linkage 51, 52 to cause tripping by reason of collapse of the toggle.

For the purpose of providing manual opening operation of both boles of the circuit breaker, means is provided including projections 33A on the handle shaft 33, see FIGURE 9. The extensions 33A extend into engagement with projections 70A of the common tripping slide members 70, 70' of the two mechanisms. The action of the projections 33A on the slide 70 is to move the slide 70 longitudinally as the handle 14 is turned. The slide 70 carries a cam member 71 pivotally supported thereon by a pin 72, and a projection or pin 73. As the slide member 70 is moved outwardly by the action of the projection 33A of the handle shaft 33 (see FIGURE 12), the projection 73 strikes a correspondingly positioned projection or boss 77 in the insulating casing of the breaker, causing the cam member 71 to pivot about the pivot pin 72 thereby causing the forward edge of the member to rise, striking the extension 59 of the cam member 56 and rotating the cam member 56 in counterclockwise direction to cause tripping. Resetting and reclosing is accomplished in the manner previously described.

Common tripping operation

For the purpose of causing tripping of both poles when one pole trips, a pair of trip interlock levers 74 and 74' are provided, see FIGURES 10 and 11 respectively. The members 74 and 74' are freely pivoted on the shaft 33, but have no other operating connection therewith. The interlock member 74 includes a projection 75 engaged between a pair of corresponding projections 76 carried by the contact carrier member 38, see FIGURE 7. The member 74' also has a projection 75', adapted to engage corresponding projections on the contact carrier 38' of the other pole. The members 74 and 74' also carry projecting arms 78 and 80, respectively, for a purpose to be described, not related to the common tripping operation.

The members 74 and 74' also include arcuate raised portions 79 and 81 respectively, which are adapted to engage an end portion of the common trip slides 70 and 70' respectively.

In operation, when one of the circuit breakers or pole trips or opens automatically, its slidable contact carrying member 38 moves toward open circuit position. This causes the projections 76 on the member 38 to act on the projection 75 of the trip member 74, rotating the member 74. The surface 79 of the trip member 74 then engages the end portion of the common trip slide 70' of the opposite pole or breaker. This action moves the slide 70' outwardly to trip the other pole in the manner previously described, through the action of the pivoted cam member 71 engaging the end portion 59 of the latch member 56.

For the purpose of aiding the extinction of the arc drawn between the contacts on opening, an insulating slide 84, 85 is provided for each pole. The slide 84 is operated by the arm 78 of the member 74 while the slide 85 is operated by the arm 80 of the member 74'. Each slide is projected between the corresponding contacts and into a blind recess 86, 87, thereby shutting off the arc.

Although the invention has been described in one specific embodiment, it will be apparent that many modifications thereof may readily be made. I therefore intend, by the appended claims to cover all such modifications as fall within the true spirit and scope of the invention.

What I claim as new and desire to secure by Letters Patent of the United States is:

1. An electric circuit breaker comprising:
   (a) a generally rectangular insulating casing having opposed side walls, opposed end walls and opposed top and bottom walls,
   (b) at least two electric circuit breakers in side-by-side relation in said casing, each of said circuit breakers including at least two relatively movable contacts,
   (c) manually operable operating means carried by said top wall of said casing for operating both of said circuit breakers simultaneously between open and closed circuit positions,
   (d) a first electric terminal means on one of said end walls electrically connected to at least one of said separable contacts of one of said circuit breakers,
   (e) second electric terminal means on the other of said end walls electrically connected to at least one of said relatively movable contacts of the other of said circuit breakers,
   (f) said casing having a corner-shaped recess at each of said end walls, said terminals being positioned in said recess, and
   (g) third and fourth terminal means carried by said casing at the bottom wall thereof, each connected to one of the other of said contacts of said circuit breakers respectively.

2. An electric circuit breaker comprising:
   (a) a generally rectangular insulating casing having opposed side walls, opposed end walls, and opposed top and bottom walls, said side walls being substantially longer than said end walls,
   (b) two electric circuit breaker mechanisms in said casing in side-by-side relation therein, each of said circuit breaker mechanisms occupying a longitudinal portion of said casing adjacent the opposite side walls thereof,
   (c) one of said mechanisms extending from one end of said casing to a point spaced from the other end of said casing and the other of said mechanisms extending from the other of said end walls to a point spaced from the first end of said casing whereby said mechanisms are in side-by-side longitudinally offset relation, (d) each of said circuit breaker mechanisms including an electric terminal connector member connected thereto and extending at a side laterally to one side of said mechanism in the direction adjacent the other mechanisms and in the corner space of the casing formed by the offset relation of said two mechanisms, and (e) each of said mechanisms having a second terminal carried by said insulating casing at a wall thereof other than said end walls, (f) manually operable operating means carried by said top wall of said casing for operating both of said circuit breakers simultaneously between open and closed circuit positions.

3. An electric circuit breaker comprising:
(a) a generally rectangular insulating casing,
(b) a pair of elongated pole chambers in said casing,
(c) each of said chambers including at least one stationary contact and at least one relatively movable contact,
(d) operating mechanism for operating said relatively movably contact in each of said chambers comprising a manually operable handle member rotatably supported in said insulating casing for rotation about an axis of rotation located entirely between said mechanisms,
(e) said manually operable handle member including a portion projecting into each of said chambers and engageable with an operating mechanism in each of said chambers for moving both of said mechanisms simultaneously in opposite directions between open and closed circuit positions by a single twisting operation of said manually operable handle,
(f) means for releasably holding said relatively movable contacts in said closed circuit position, and
(g) current responsive means for causing release of said movable contacts upon the occurrence of predetermined current conditions.

4. An electric circuit breaker comprising:
(a) a generally rectangular insulating casing having opposed side walls, opposed end walls, and opposed top and bottom walls,
(b) at least two circuit breaker pole chambers in said insulating casing extending substantially from end-to-end thereof parallel to said side walls,
(c) at least one stationary contact and at least one relatively movable contact in each of said pole chambers,
(d) manually engageable operating means for operating said movable contacts between open and closed circuit positions comprising a manually operable handle member supported on said top wall of said casing, a manual operating shaft extending substantially parallel to said side walls and perpendicular to said top wall in the space between said pole chambers, said operating shaft being rotatable about its own axis,
(e) operating means extending from said operating shaft at opposite sides thereof into engagement with an operating mechanism in each of said pole chambers respectively whereby rotation of said operating shaft by means of said manually operable handle operates said movable contacts in both of said pole chambers simultaneously between open and closed circuit conditions,
(f) current responsive latching means for retaining said movable contacts in said closed circuit conditions when moved thereto by said manually operable handle member.

5. A multipole electric circuit breaker as set forth in claim 4 wherein said movable operating mechanisms in each of said pole chambers are moved simultaneously in opposite directions by means of said operating handle.

6. An electric circuit breaker comprising:
(a) a generally rectangular insulating enclosure having opposed side walls, opposed end walls, and opposed top and bottom walls,
(b) a pair of circuit breaker pole chambers in said enclosure extending substantially completely between said top and bottom walls and parallel to said side walls,
(c) a first one of said pole chambers having a relatively stationary contact therein adjacent a first end of said enclosure,
(d) the other of said pole chambers having a relatively stationary contact therein adjacent the other end of said enclosure,
(e) a relatively movable contact in said first one of said chambers, movable in a first direction between open and closed circuit positions,
(f) a relatively movable contact member in said second pole chamber and movable in a direction opposite to said first direction between open and closed circuit positions,
(g) a manually operable handle member carried by said enclosure and rotatably supported for rotation on an axis of rotation extending parallel to said side walls and substantially perpendicular to said top wall in the space between said pole chambers, and
(h) means connecting said manually operable member to each of said mechanisms in said pole chambers, whereby rotation of said manually operable member simultaneously operates said relatively movable contact members in said pole chambers in opposite directions toward closed circuit position.

7. An electric circuit breaker as set forth in claim 6 wherein said circuit breaker also includes current responsive releasable means for releasably retaining said relatively movable contact members of each of said poles in closed circuit position.

8. An electric circuit breaker as set forth in claim 6 wherein said circuit breaker also includes a first terminal carried by said enclosure on said one end wall and electrically connected to said first circuit breaker mechanism, and a second terminal member carried by said insulating enclosure on said second end wall and electrically connected to said circuit breaker mechanism of said other pole chamber, said first terminal being the only terminal located on said one end wall and said second terminal being the only terminal located on said second end wall.

9. An electric circuit breaker comprising:
(a) a generally rectangular insulating enclosure having opposed side walls, opposed end walls, and opposed top and bottom walls,
(b) a pair of circuit breaker pole chambers in said enclosure extending substantially completely between said top and bottom walls and parallel to said side walls,
(c) a first one of said pole chambers having a relatively stationary contact therein adjacent a first end of said enclosure,
(d) the other of said pole chambers having a relatively stationary contact therein adjacent the other end of said enclosure,
(e) a relatively movable contact in said first one of said chambers, movable in a first direction between open and closed circuit positions,
(f) a relatively movable contact member in said second pole chamber and movable in a direction opposite to said first direction between open and closed circuit positions,
(g) a manually operable handle member carried by said enclosure and extending parallel to said side walls and substantially perpendicular to said top wall in the space between said pole chambers,
(h) means connecting said manually operable member to each of said mechanisms in said pole chambers, whereby rotation of said manually operable member simultaneously operates said relatively movable contact members in said pole chambers in opposite directions toward closed circuit position,
(i) a first terminal carried by said enclosure on said one end wall and electrically connected to said first circuit breaker mechanisms,
(j) a second terminal member carried by said insulating enclosure adjacent said second end wall and electrically connected to said circuit breaker mechanism of said other pole chamber, and
(k) said first and second terminal members each having a dimension equal to at least one half of the distance between said opposed side walls of said enclosure.

10. A two-pole electric circuit breaker comprising:
(a) an insulating casing having opposed side and end walls, and opposed top and bottom walls,
(b) a pair of pole chambers within said casing extending parallel to said side walls and substantially completely between said top and bottom walls,
(c) at least one stationary contact in each of said pole chambers,
(d) at least one relatively movable contact in each of said pole chambers, said relatively movable contacts being slidable reciprocally in a direction parallel to said side walls and substantially parallel to said top and bottom walls,
(e) releasable latch means in each of said pole chambers releasable to cause automatic opening movement of said relatively movable contact of said corresponding pole chamber,
(f) manually engageable operating means operating said movable contacts comprising a manually operable handle member supported for rotation in said insulating casing on an axis extending between said pole chambers parallel to said side walls and substantially perpendicular to said top wall, said operating means having means for engaging each of said relatively movable contacts in each of said pole chambers to move said contacts from open to closed circuit position,
(g) common tripping means pivotally supported between said pole chambers and including a first portion disposed and arranged to be engaged by said relatively movable contacts upon release thereof by said releasable latch means, said tripping member including a portion engageable with said releasable latch means of said other pole to cause automatic opening of said second mechanism upon opening of said first mechanism.

References Cited by the Examiner

UNITED STATES PATENTS

| | | | |
|---|---|---|---|
| 2,156,761 | 5/1939 | Jackson et al. | 200—116 |
| 2,352,928 | 7/1944 | Woods | 200—116 |
| 2,646,488 | 7/1953 | Platz | 200—18 X |
| 2,711,450 | 6/1955 | Carr | 200—18 |
| 2,797,277 | 6/1957 | Dorfman et al. | 200—116 |
| 2,887,548 | 5/1959 | Middendorf | 200—116 |
| 2,913,542 | 11/1959 | Myers | 200—116 X |
| 3,018,351 | 1/1962 | Middendorf | 200—116 |

BERNARD A. GILHEANY, *Primary Examiner.*